July 3, 1923.
F. H. ROYCE
1,460,768
MOUNTING AND DRIVING OF GEAR WHEELS
Filed Dec. 13, 1922    2 Sheets-Sheet 1
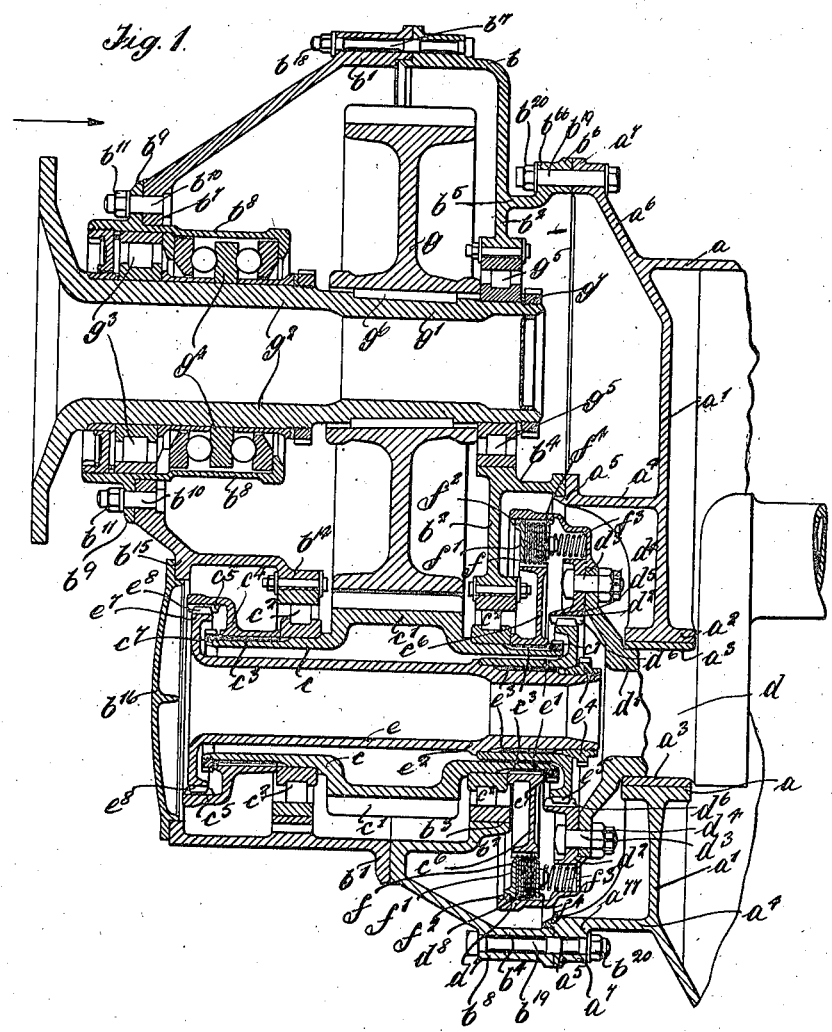
Inventor.
Frederick Henry Royce.
Attorney.

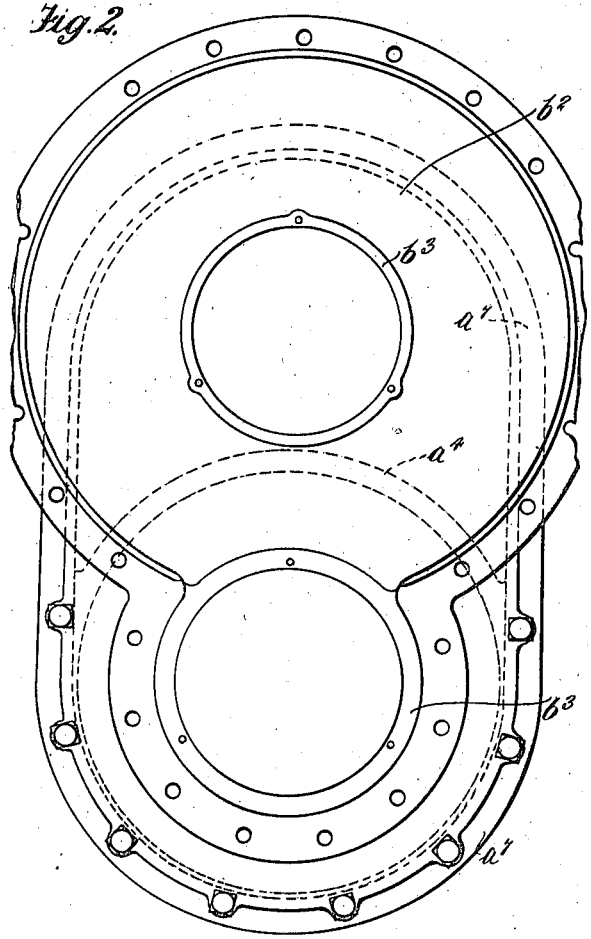

Patented July 3, 1923.

1,460,768

UNITED STATES PATENT OFFICE.

FREDERICK HENRY ROYCE, OF DERBY, ENGLAND, ASSIGNOR TO ROLLS ROYCE LIMITED, OF DERBY, ENGLAND, A COMPANY OF GREAT BRITAIN.

MOUNTING AND DRIVING OF GEAR WHEELS.

Application filed December 13, 1922. Serial No. 606,684.

*To all whom it may concern:*

Be it known that I, FREDERICK HENRY ROYCE, residing at Derby, England, a subject of the King of Great Britain and Ireland, have invented certain new and useful Improvements in the Mounting and Driving of Gear Wheels (for which I have filed applications in England, No. 26,839, 11th October, 1921; Italy, No. 44,766, 18th November, 1922; France, No. 166,586, 23rd November, 1922; Spain, 23rd November, 1922; Germany, 28th November, 1922), of which the following is a specification.

This invention relates to the method of connecting a driving shaft, which may be an engine shaft (and is hereinafter referred as the engine shaft), and a driven shaft which is co-axial therewith, in which the driven shaft is hollow and a connecting shaft is provided within the driven shaft and connected by interlocking serrations to both the engine shaft and to the driven shaft, the connection between the said driven shaft and the connecting shaft being at the end remote from the engine shaft.

The connecting shaft is also torsionally flexible, by which means there are secured between the engine shaft and the driven shaft an amount of flexibility in an axial direction, flexibility to compensate for want of alignment and resilient driving effort.

Now the present invention comprises for use in such a method of connecting two such shafts, a mechanism for damping torsional vibrations which under some conditions of speed and load may be set up in the connecting shaft; and in the preferred form of the present invention this is effected by coupling the engine shaft, or the end of the connecting shaft adjacent the engine shaft, to the end of the pinion or driven shaft adjacent the engine shaft through the medium of a slipping device, preferably in the form of a friction coupling of the multiple plate type, so that said connecting shaft is coupled directly or indirectly to both ends of the pinion shaft but at one end through a slipping device. The slipping device should be designed to take up say one eighth of the total torque which the engine applies to the driven shaft.

In the accompanying drawings is shown an example of the invention, Figure 1 being a central vertical section and Figure 2 a front view of the gear box or casing alone looking in the direction of the arrow in Figure 1, with one half removed.

$a$ is the crank shaft case, having formed thereon the diaphragm $a^1$ which has a hole therethrough for the crank shaft to pass; $a^2$ is an annular boss around such hole to receive and support the bearings $a^3$ of the crank shaft; $a^4$ is an annular projection formed on the diaphragm $a^1$ and rabbeted as shown at $a^5$; $a^6$ is an elliptic extension formed on the casing $a$, on which is formed an elliptic flange $a^7$ which coalesces with the annular extension $a^4$ and has a number of bosses $a^{77}$ with holes therethrough to receive connecting bolts.

The gear case is formed in two parts $b$ and $b^1$. On part $b$ is formed a diaphragm $b^2$ with holes therethrough for the shafts of the driving and driven pinions to pass through. Around these holes are annular bosses $b^3$ $b^3$ to receive and support the bearings of the shafts hereinafter referred to. $b^4$ is an annular projection formed on the diaphragm $b^2$ which fits against the rabbet $a^5$ of the projection $a^4$; $b^5$ is a semi-oval projection formed on or attached to the diaphragm $b^2$ and on which is formed an elliptic flange $b^6$ which coalesces with the annular extension $b^4$ and has a number of bosses $b^{66}$ with holes therethrough to receive connecting bolts.

The upper half of the part $b^1$ of the gear case is projected in the form of a truncated cone and terminates in an internally projecting flange $b^7$ with a number of bolt holes therethrough; $b^8$ is a housing having formed thereon a flange $b^9$ with bolt holes therethrough corresponding with the holes in flange $b^7$ and secured thereto by bolts $b^{10}$ and nuts $b^{11}$. The housing $b^8$ supports and locates bearings for the driven shaft hereinafter referred to. The lower half of the part $b^1$ of the gear case is cylindrical in shape and has an internally projecting flange $b^{14}$ which receives and supports bearings for the driving pinion shaft hereinafter referred to, and a flange $b^{15}$ which receives the cover $b^{16}$. The two parts $b$ and $b^1$ of the gear case are held together by a number of bolts and nuts $b^{17}$ and $b^{18}$, and the gear case is secured to the crank case by a number of bolts and nuts $b^{19}$ and $b^{20}$. $c$ is the shaft of the driving pinion with the pinion $c^1$ integral therewith, mounted in two roller bearings $c^2$ $c^2$, of which the inner races are rigidly fixed to the shaft $c$ and the outer races are secured respectively to the flange $b^{14}$ and the diaphragm $b^2$.

On the shaft $c$ are formed serrations $c^3$ $c^3$ at each end. $c^4$ is an annular member having two diameters, with internal serrations formed on the smaller end to engage the serrations on the shaft $c$ and internal teeth $c^5$ on the larger end. $c^6$ is an annular disc like member with annular flanges on its inner and outer circumferences and having formed on the outer flange external axial serrations to engage the plates of the friction clutch hereinafter described; $c^7$ $c^7$ are nuts engaging threads at the ends of the shaft $c$ to locate thereon the races of the roller bearings and the members $c^4$ and $c^6$.

$d$ is the crank shaft and $d^1$ a flange formed thereon or attached thereto. $d^2$ is an annular member secured to the flange $d^1$ by a number of bolts and nuts $d^3$ and $d^4$, cup-like in shape with a hole through the centre; and at the rim of such hole is an internally projecting flange $d^5$ on which are formed teeth $d^6$, and having on its outer rim $d^7$ internal axial serrations $d^8$. $e$ is a floating hollow connecting shaft rigidly connected to the annular member $e^1$ which abuts against a shoulder $e^2$ and is secured rotatively in relation to the shaft $e$ by mutually engaging serrations $e^3$ and axially by nut $e^4$ engaging a thread on the shaft $e$.

On the outer circumference of member $e^1$ are formed teeth $e^5$ engaging the teeth $d^6$ and forming a driving connection between the crank shaft $d$ and the connecting shaft $e$. The other end of the shaft $e$ opens outwards and terminates in a flange $e^7$, on the outer side of which are teeth $e^8$ engaging the teeth $c^5$ on the pinion shaft $c$.

Axial movement of the connecting shaft is limited by coming into contact with one end or the other of the pinion shaft.

The connecting shaft $e$ thus forms a driving connection between the crank shaft $d$ and the pinion shaft $c$, and by reason of its being unsupported by bearings and connected to the two shafts $c$ and $d$ in the manner described, it will continue to drive without any mischief notwithstanding any slight want of alignment between said shafts $c$ and $d$. Further the connecting shaft $e$ is capable of yielding to a degree under torsional strain and thus supplies a resilient or spring effect to the drive.

$f$ is a series of annular friction discs alternately serrated to engage the serrations on the member $d^2$ and the member $c^6$ respectively; $f^1$ is an annular plate locating the friction discs $f$ and secured on one side by split ring $f^2$. $f^3$ are a number of helical springs located in pockets formed in the member $d^2$ urging an annular plate $f^4$ (which is serrated on the outer circumference to engage the serrations on the member $d^2$) against the discs $f$, thus forming a friction coupling drive between the crank shaft $d$ and the adjacent end of the pinion shaft $c$. The said friction coupling is adjusted to take about one eighth of the torque strain exerted by the engine on the pinion shaft $c$ before slipping, and the effect is to damp torsional vibrations in the connecting shaft $e$.

$g$ is the driven pinion mounted on the tapered portion $g^1$ of the driven or propeller shaft $g^2$ supported in roller bearings $g^3$ (which with the thrust bearings $g^4$ are housed in housing $b^8$) and roller bearings $g^5$. The pinion $g$ is secured to the saft $g^1$ for the drive by keys $g^6$ and secured axially by the inner race of the roller bearing $g^5$ and the nut $g^7$.

What I claim as my invention and desire to secure by Letters Patent of the United States is:—

1. In a gear mounting, the combination of a driving shaft, a driven shaft coaxial therewith, the latter shaft being hollow, a connecting shaft located within said driven shaft, connecting means between one end of the connecting shaft and the adjacent end of said driving shaft, other connecting means between the opposite end of said connecting shaft and the driven shaft, and a slipping driving connection between adjacent ends of the driven shaft and driving shaft.

2. In a gear mounting, the combination of a driving shaft, a driven shaft coaxial therewith, the latter shaft being hollow, a connecting shaft located within said driven shaft, connecting means between one end of the connecting shaft and the adjacent end of said driving shaft, other connecting means between the opposite end of said connecting shaft and the driven shaft, and a slipping driving connection between the driven shaft and that end of the connecting shaft which is adjacent the driving shaft.

3. In a gear mounting, the combination of a driving shaft, a driven shaft coaxial therewith, the latter shaft being hollow, a connecting shaft located within said driven shaft, connecting means between one end of the connecting shaft and the adjacent end of said driving shaft, other connecting means between the opposite end of said connecting shaft and the driven shaft, and a friction coupling constituting a slipping driving connection between adjacent ends of the driving and driven shafts.

4. In a gear mounting, the combination of a driving shaft, a driven shaft coaxial therewith, the latter shaft being hollow, a connecting shaft located within said driven shaft, connecting means between one end of the connecting shaft and the adjacent end of said driving shaft, other connecting means between the opposite end of said connecting shaft and the driven shaft, and a friction coupling constituting a slipping driving connection between the driven shaft and that end of the connecting shaft which is adjacent the driving shaft.

5. In a gear mounting, the combination of a driving shaft, a driven shaft coaxial therewith, the latter shaft being hollow, a connecting shaft located within said driven shaft, connecting means between one end of the connecting shaft and the adjacent end of said driving shaft, other connecting means between the opposite end of said connecting shaft and the driven shaft, and means interposed between the driving and driven shafts for damping torsional vibrations in the connecting shaft.

6. In a gear mounting, the combination of a driving shaft, a hollow driven shaft coaxial therewith, a connecting shaft disposed within the driven shaft and coupled to the same at one end, a member secured to the driving shaft and coupled to the other end of the connecting shaft, and a friction coupling carried by said member for coaction with the adjacent end of the driven shaft.

7. In a gear mounting, the combination of a driving shaft, a hollow driven shaft coaxial therewith, a connecting shaft disposed within the driven shaft and coupled to the same at one end, a cup-shaped member secured to the driving shaft and coupled to the other end of the connecting shaft, a set of friction discs carried by and coupled to said member, and an annular member encircling and coupled to the driven shaft and encircled by and coupled to the friction discs.

8. In a gear mounting, the combination of a driving shaft, a hollow driven shaft coaxial therewith, a connecting shaft disposed within the driven shaft and coupled to the same at one end, a cup-shaped member secured to the driving shaft and coupled to the other end of the connecting shaft, a set of friction discs carried by and coupled to said member, and an annular disc interposed between the friction discs and the driven shaft and having its outer and inner edges serrated for coaction with serrations formed on the inner edges of said friction discs and on the outer surface of said driven shaft.

9. A gear mounting according to claim 8, in which the cup-shaped member is provided on its inner wall with serrations disposed co-planar with the friction discs and the annular disc; and in which the serrations of alternate friction discs are engaged with the serrations on said cup-shaped member and on the outer edge of said annular disc.

10. In a gear mounting, the combination of a driving shaft, a hollow driven shaft coaxial therewith, a connecting shaft disposed within the driven shaft, said driven and connecting shafts having coacting driving teeth at one end, the other end of the connecting shaft and the driving shaft also having coacting driving teeth, and a slipping driving connection between adjacent ends of the driven and driving shafts.

In witness whereof I have signed this specification.

FREDERICK HENRY ROYCE.